July 22, 1969 HANS-JOACHIM KLEMP ET AL 3,457,374
RECORDING METHOD AND APPARATUS FOR COMPENSATING THIRD ORDER DISTORTIONS
Filed July 16, 1965
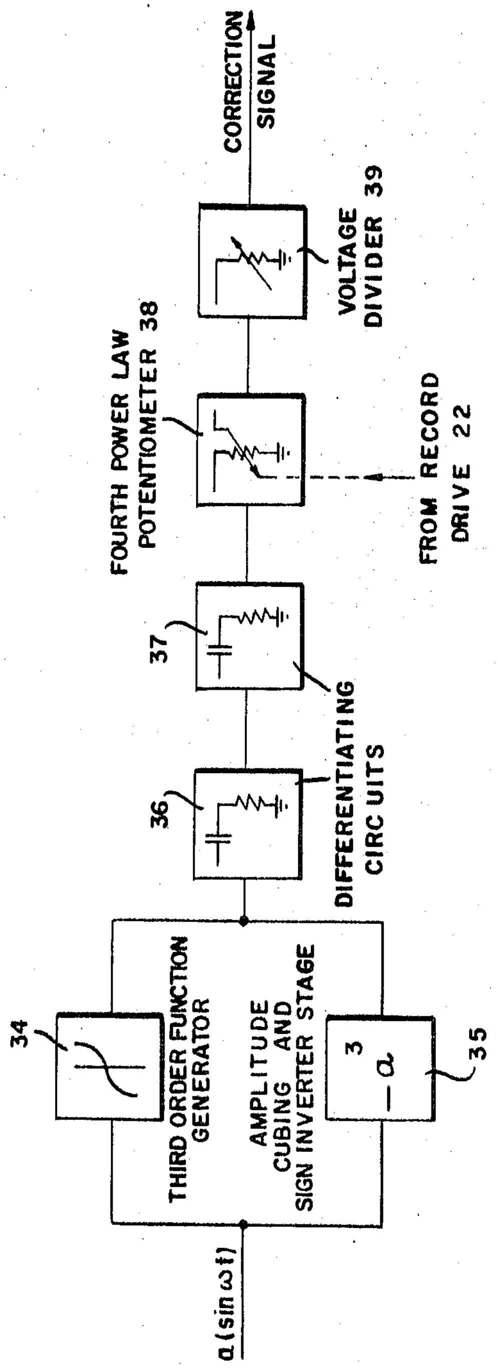
INVENTORS
Hans-Joachim Klemp &
Horst Redlich
BY Spencer & Kaye
ATTORNEYS United States Patent Office 3,457,374

Patented July 22, 1969

3,457,374
RECORDING METHOD AND APPARATUS FOR COMPENSATING THIRD ORDER DISTORTIONS

Hans-Joachim Klemp and Horst Redlich, Berlin, Germany, assignors to Teldec Telefunken-Decca Schallplatten G.m.b.H., Hamburg, Germany Filed July 16, 1965, Ser. No. 472,519
Claims priority, application Germany, July 17, 1964, T 26,615
Int. Cl. G11b 3/00
U.S. Cl. 179—100.4 7 Claims

ABSTRACT OF THE DISCLOSURE

A method and electrical apparatus for compensating third order distortions occurring during the cutting of an original disc in sound recording, such distortions being compensated by deriving, from the original recording signal, a signal whose amplitude is equal to the third power of the amplitude of the recording signal and whose frequency is equal to three times that of the recording signal, producing a signal which is proportional to the second time derivative of such derived signal, and multiplying the resulting signal by a factor which represents the reciprocal of the fourth power of the velocity of the record groove being cut and by a factor representing a constant associated with a particular playback stylus, thus producing a correction signal which is applied to the cutting head together with the original information signal.

The present invention relates to sound recording, and particularly to recording in accordance with the stylus sound recording and reproducing principle, in the two-component writing mode.

A device and method have already been disclosed for substantially avoiding the known geometrical scanning distortions occurring in stylus sound recording made in the two-component writing manner. Such are described, for example, in an article by applicants published in the Journal of the Audio Engineering Society, vol. 13, No. 2 (April, 1965) pages 111–118. However, prior to the present invention, distortions of only the second order have been considered. The present invention consitutes an improvement over the prior art by also permitting the substantial avoidance of distortions of the third order.

The original cause of the above-mentioned scanning distortions is known per se, so that no detailed explanations are required with respect to this point. However, it may be stated briefly that these distortions arise on account of the fact that the center of the hemisphere defining the tip of the pick-up needle does not follow the groove deflections correctly, and that a distinction must be made between distortions in the reproduction of the hill-and-dale recording component and distortions in the reproduction of the lateral recording component, these distortions being called "track distortions" and "distortions on account of the clamping effect," respectively. Furthermore, it is known that geometrical pick-up distortions can be caused by the fact that the plane of motion of the recording system does not coincide with that of the pick-up.

Quantitative evaluation of the distortion components have demonstrated that the distortions diminish rapidly for the higher orders of harmonics, and that the second harmonic is the main cause of distortions. Therefore, the above-mentioned previous efforts were concerned with decreasing the distortions of the second order. However, practical experience has shown that distortions of the third order, though being of no consequence when distortions of the second order are present, can become very disturbing once the previously discussed measures for decreasing the magnitude of distortions of the second order have been applied. The residual proportion of distortions of the second order is then much smaller than the proportion of distortions of the third order, which latter is present to its full extent. As a result, it becomes desirable to also decrease these distortions of the third order to a corresponding degree.

It is, therefore, an object of the present invention to decrease the third-harmonic distortions generally existing in the playback of record discs.

The invention constitutes an improvement on a known method for stylus sound recording in the two-component writing manner, using a cutting head with a cutting stylus whose cross section deviates from the circular shape, with compensation of the geometrical scanning distortions by superimposing a correction signal.

More specifically, the present invention is concerned with reducing the level of the third-harmonic distortions normally occurring when a recording is played back, this reduction being effectuated through the use of a specific type of correction signal. According to the present invention, a correction signal capable of achieving the desired results is produced by carrying out the following opeartions on the basic information-carrying signal to be recorded:

The amplitude of this signal is raised to the third power and the signal frequency is tripled;

The resulting signal is then differentiated with respect to time twice in succession;

The output of the second differentiation is then multiplied by an amount proportional to the reciprocal of the fourth power of the velocity of the record carrier with respect to the cutting head. The signal resulting from these operations is then applied to the cutting head in such a way as to drive the head in the same direction as that produced by the original information signal.

In one form of apparatus for carrying out the above-described operations according to the invention, a function generator, comprising two stages operating in parallel, is provided for the increase to the third power and for tripling the frequency of the information signal, one of these stages comprising a unit having a transfer, or input-output, characteristic curve in the form of a curve of the third order and the other comprising a unit for generating a signal whose amplitude is proportional to the third power of the information signal amplitude and for inverting the sign of the input. At the output of the parallel circuit, there may be provided two stages, known per se, each having a series capacitance followed by a parallel conductance. These stages are provided for differentiation and phase shifting, as well as for introducing an attenuation factor which increases with the square of the frequency. Such a device may then preferably be provided with a voltage divider having a suitable non-linear resistance for permitting the output of the second differentiator stage to be multipled by an amount proportional to the reciprocal value of the fourth power of the relative velocity of the record carrier with respect to the cutting head. The movable member of this voltage divider is coupled with the drive for the groove advancement, in a recording device for disc records, mechanically or, via a remote control device, electrically.

In effect, it has been discovered that the correct compensation signal for distortions of the third order can be defined by the following equation:

$$As_3 = -\frac{3}{2}\pi^2 r^2 f^2 \frac{a^3}{v^4} (\cos 3\omega t) \quad (1)$$

As in the case of the previously disclosed method for decreasing distortions of the second order with the aid of a correction signal produced by function generators, the compensation signal of the present invention, for compensating the distortions of the third order, is likewise derived from the information signal by means of suitable function generators. The apparatus for deriving the compensating signal for decreasing the distortions of the third order is, however, constructed in a somewhat more complicated manner than the function generators for the correction signals which act to decrease the distortions of the second order. The reason for this is that a sine wave, which may be expressed as:

$$a \cdot \sin \omega t$$

readily yields a wave having the form:

$$a^2 \sin 2\omega t$$

when passed through a function unit whose characteristic is in the form of a parabola of the second order. However, if the unit had a third order transfer function, the output would be in the form:

$$a^3 \sin^3 \omega t = \tfrac{3}{4} a^3 \sin \omega t - \tfrac{1}{4} a^3 \sin 3\omega t \qquad (2)$$

or, expressed differently: at the output of such a circuit, there will appear 75% fundamental wave and 25% third third harmonic. In order to obtain only the third harmonic, the component $a^3 \sin \omega t$ must be eliminated. In accordance with the present invention, this is accomplished with the aid of a circuit which is connected in parallel with the above-described processing unit and which is designed to yield the following result:

$$\tfrac{1}{4} a^3 \sin \omega t + \tfrac{1}{4} a^3 \sin 3\omega t \qquad (3)$$

It is then necessary only to multiply the amplitude of one of the two outputs by a suitable constant and to subtract one output from the other in order to obtain the desired signal:

$$K (a^3 \sin 3\omega t),\ K = \tfrac{2}{3} \qquad (4)$$

This signal is then passed through two stages in which it is differentiated with respect to time and phase shifted, the differentiation having the effect of introducing an attenuation factor whose value is directly proportional to the square of the information signal frequency, and then through an output stage which modifies the signal as a function of the linear grooves velocity, thereby yielding a compensation signal which corresponds to the term $As_3$ of Equation 1. In this equation, $As_3$ represents the desired correction signal, $r$ is the radius of the hemisphere defining the tip of the pick-up needle, $v$ is the so-called groove velocity, i.e., the advancing speed of the groove with respect to the cutting stylus, $f$ is the information signal frequency in c.p.s. $(=\omega/2\pi)$ $t$ is time, and $\omega$ is the information signal angular frequency in radius/sec.

Additional objects and advantages of the present invention will become apparent upon consideration of the following description when taken in conjunction with the accompanying drawings in which the single figure shows a simplefied block circuit diagram depicting the essential components of a device for practicing the method according to the invention.

The device is generally employed in combination with the previously mentioned apparatus for the compensation of playback distortions of the second order. In the two parallel-connected stages 34 and 35, the information signal is raised to the third power and tripled in its frequency. Stage 34 contains a unit having a transfer characteristics curve of the third power type, this being indicated by the curve within box 34. This stage converts any desired input signal $a \sin \omega t$ into $a^3 \sin \omega - a^3 \sin 3\omega t$. In the parallel-connected stage 35, only the factor $a$ is dealt with, the output being proportional to $-a^3$ and the sine factor being left unchanged in this process. The output signals of the two stages 34 and 35 are then combined in such a manner that the expression $a^3 \cdot \sin 3\omega t$ remains. Since the dynamic cutting head to which the final correction signal is delivered has the property of producing the time derivative of the signals which it receives, this expression will be changed to $a^3 \cos 3\omega t$ by the cutting head so that, as a result of the combination of the outputs from the two stages 34 and 35, two of the factors on the right side of Equation 1 are obtained. The two subsequent differentiating stages 36 and 37 are constructed in conventional manner and process the signal in such a way as to introduce the squared frequency factor $(f^2)$ and so as to obtain the desired phase relationship between the correction signal and the original information signal. The voltage divider potentiometer member following thereafter and designated by 38 acts as a multiplying means which multiplies the differential signal by a factor which is inversely proportional to the fourth power of the groove speed $v$. To this end, the voltage divided of this stage is provided with a non-linear fourth power resistance so that the resistance between one end of the resistor and the movable tap is proportional to the fourth power of the distance separating these two points. The tap of this voltage divider is controlled by means of a drive 22 so that the tap position is dependent upon the groove velocity. The output voltage divider 39 serves to introduce the remaining factors appearing on the right side of Equation 1

$$\left(-\frac{3}{2}\pi^2 r^2\right)$$

all of these factors being constant for a given type of pick-up.

The drive 22 may be of any well-known type capable of converting a velocity signal into a mechanical position control, such an operation being well within the capability of many commonly used feedback controlled servo systems. Circuits capable of performing the intended operations of the other units described above are well-known, commercially available devices and need not be described in detail here.

Practical tests have demonstrated that because of the additional reduction of distortions of the third order in accordance with the teachings of the present invention, the quality of a stylus sound recording can be improved to such an extent that savings can be made in other areas. Thus, while obtaining a recording reproduction of the same quality as was previously possible, it is possible either to increase the volume of the recording signal, or to maintain the previously used volume while using a slower groove velocity.

It will be understood that the above description of the present invention is susceptible to various modifications, changes, and adaptations, and the same are intended to be comprehended within the meaning and range of equivalents of the appended claims.

What is claimed is:

1. In a recording device wherein a record is moved with respect to a groove cutting head, an apparatus for producing a signal which corrects for third-harmonic distortions, said apparatus comprising, in combination:
   - (a) function generator means connected to receive a basic recording information signal for producing a processed signal whose amplitude is proportional to the third power of said information signal and whose frequency is equal to three times the frequency of said information signal;
   - (b) differentiating means connected to the output of said function generator means for producing a signal which is proportional to the second time derivative of said processed signal;
   - (c) multiplying means connected to the output of said differentiating means for multiplying the output thereof by a quantity proportional to the reciprocal of the fourth power of the velocity of the record groove being cut with respect to the cutting head.

2. A device as defined in claim 1, further comprising means for applying the output signal from said multiplying means to the cutting head to drive the latter in the same direction as does said information signal.

3. A device as defined in claim 1 wherein said function generator means comprises a first signal processing path having a third order transfer characteristic; and a second signal processing path in parallel with said first signal processing path for producing a signal whose amplitude is equal to the third power of said information signal and whose sign is the inverse of that of said information signal.

4. A device as defined in claim 3 wherein said differentiating means comprises two units connected in series, each of which units comprises a series capacitance followed by a parallel conductance, each unit serving to phase shift said processed signal.

5. A device as defined in claim 3 wherein said multiplying means comprises a potentiometer having a fourth power law resistance and a movable tap, and means for positioning said tap as a function of the relative velocity of the record groove being cut with respect to the cutting head.

6. In a method for stylus sound recording according to the two-component writing mode using a cutting head with a cutting stylus whose cross section deviates from a circular shape, with compensation of geometrical playback distortions by superposing a correction signal, a method for deriving said signal starting from the basic information signal to be recorded, which information signal is in the form of a sine wave of varying amplitude, comprising the steps of:

(a) producing a signal whose amplitude is proportional to the third power of said information signal and whose frequency is equal to three times that of said information signal;

(b) obtaining the second time derivative of the signal thus produced;

(c) multiplying the signal thus differentiated by a quantity which is proportional to the reciprocal value of the fourth power of the relative velocity of the record groove being cut with respect to the cutting head; and (d) applying the resulting compensation signal to the cutting head for driving said cutting head in the same direction as does said information signal.

7. A method as defined in claim 6 for producing a stereo recording, wherein a second correction signal, similar to said correction signal, is derived for controlling the movement of said cutting head in a second direction.

References Cited

UNITED STATES PATENTS

| | | | |
|---|---|---|---|
| 1,713,039 | 5/1929 | Espenschied | 179—100.4 |
| 2,122,207 | 6/1938 | Kellogg | 179—100.4 |
| 2,284,744 | 6/1942 | Kellogg | 179—100.4 |
| 3,013,125 | 12/1961 | Goldmark et al. | 179—100.4 |
| 3,229,048 | 1/1966 | Fox | 179—100.4 |

OTHER REFERENCES

Cooper, Integrated Treatment of Tracing and Tracking Error, J. Audio Eng. Soc. v. 12, p. 2, (1/64).

Redlich and Klemp, A New Method of Disc Recording For Reproduction With Reduced Distortion: The Tracing Simulator, J. Audio Eng. Soc. v. 13, p. 111.

JAMES W. MOFFITT, Primary Examiner

RAYMOND F. CARDILLO, Jr., Assistant Examiner